UNITED STATES PATENT OFFICE.

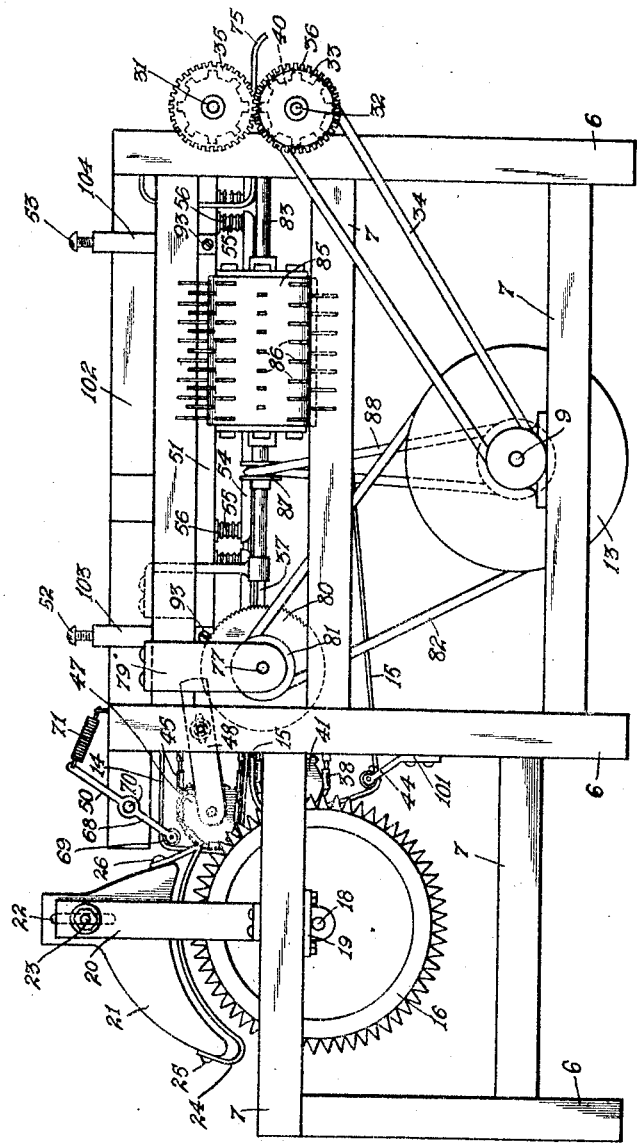

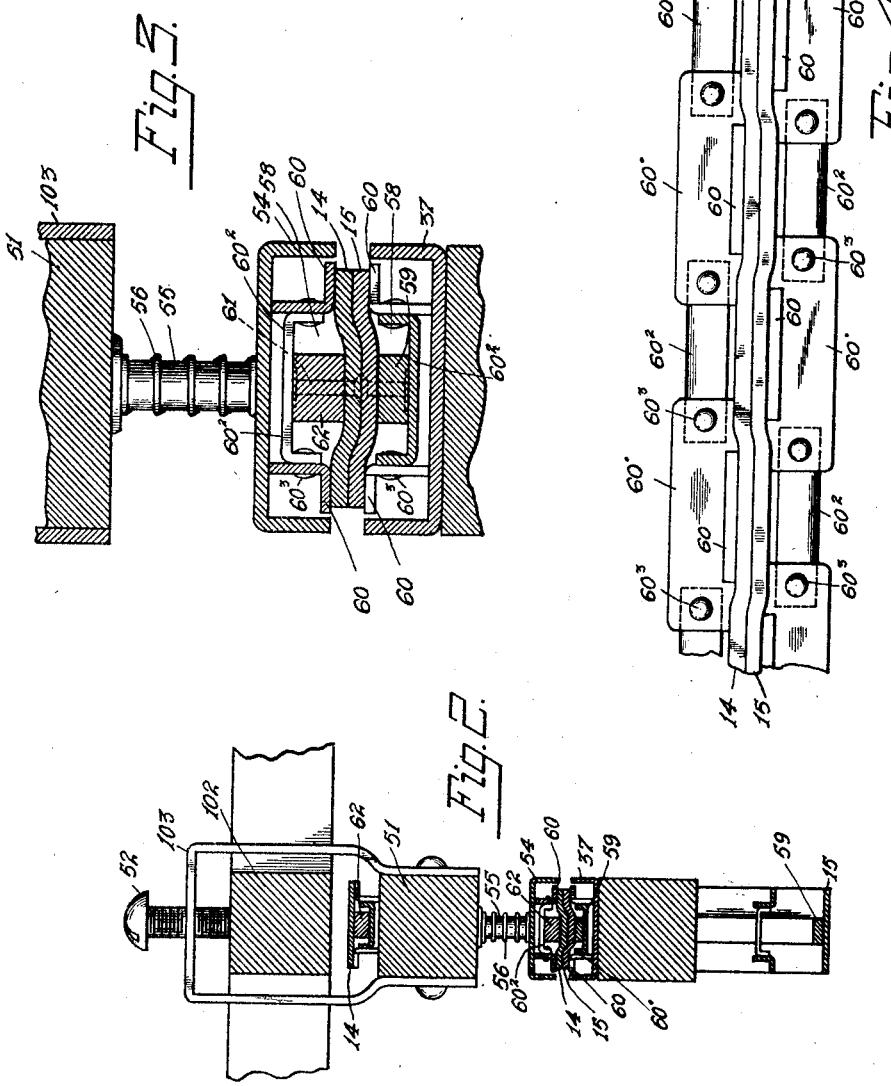

GEORGE E. RUDOLPH, OF CHICAGO, ILLINOIS.

CONVEYING MECHANISM FOR BROOM-CORN MACHINES.

1,344,006.　　　　　Specification of Letters Patent.　　Patented June 22, 1920.

Original application filed May 28, 1917, Serial No. 171,393. Divided and this application filed October 25, 1917. Serial No. 198,395.

*To all whom it may concern:*

Be it known that I, GEORGE E. RUDOLPH, a citizen of the United States of America, residing in Chicago, county of Cook, State of Illinois, have invented certain new and useful Improvements in Conveying Mechanism for Broom-Corn Machines, of which the following is a specification.

My invention in general relates to devices for use in preparing broom straw for the manufacture of brooms and other similar devices, and more particularly to the conveying mechanism used in devices of this character which operate to transmit the spears of broom corn past certain devices, which devices operate to prepare the broom straw for use in the manufacture of brooms. This application is a division of my application for broom straw cutting and flailing machines, filed May 28, 1917, Serial No. 171,393. Reference is here made to said application Serial No. 171,393 for a more complete understanding of the detailed parts, construction and operation of said broom straw cutting and flailing machines.

The object of my invention is to provide a conveying mechanism which will quickly, cheaply, and efficiently transmit the spears of broom corn from the feeding table of the broom corn machine, past a number of devices which operate to prepare the spears of broom corn for use, into a catch-pan. This conveying mechanism must very securely hold the broom corn while it is being operated upon by the preparing devices and must be readily and quickly adjustable.

A further object of my invention is to provide conveying mechanism of the character described above, which firmly and tightly grasps the spears of broom corn and not only prevents the spears of corn from being pulled from between the upper and lower portion of the conveyer mechanism but also prevents the spears of corn from being twisted sidewise while being operated upon by the above-mentioned preparing devices.

Other objects of my invention will be more particularly pointed out in the ensuing specification and in the appended claims, reference being had to the accompanying drawings forming a part hereof, in which the same reference characters indicate like parts throughout the several views, and in which:

Figure 1 is a side view of the complete device of my invention;

Fig. 2 is a partial enlarged sectional view showing the conveying mechanism of my invention;

Fig. 3 is an enlarged sectional view showing the upper and lower endless belts and their driving chains, and Fig. 4 is a detailed enlarged side view showing the links of the driving chain and the upper and lower belts between which the broom corn is firmly held when being transmitted.

Referring now more in detail to my invention as illustrated, it comprises a large rectangular wooden mounting frame consisting of upright posts 6 and cross connecting members or beams 7. Attached to the mounting frame is a feeding table which supports the mechanism for conveying the spears of the broom corn to the endless conveyer mechanism from the feeding table. Secured to the large rectangular mounting frame by means of bearings, is a main power shaft 9 which is connected with any suitable source of power, such as an electric motor or the like. Secured to the shaft 9 are four pulleys (only two of which are shown) for transmitting power to the different parts of the mechanism. Supported by the large rectangular frame and mounted at right angles to the shaft 9, is an endless conveyer mechanism consisting of a pair of traveling belts 14 and 15, as hereinbefore mentioned. Attached to the main rectangular frame, is a similar rectangular frame that supports a pair of rotatable serrated wheels 16 (only one of which is shown) which convey the spears of broom corn to the above-mentioned conveyer mechanism.

The wheels 16 are suitably secured to a rotatable shaft 18 that is provided with bearings 19. Connected to the cross connecting bars that support the bearings 19, is an upright member 20 that supports a guide mechanism for guiding the broom corn over the wheels 16 onto the conveyer mechanism. The guiding mechanism comprises an irregularly shaped block 21 provided with a slot 22 through which passes a bolt 23 so that the block 21 may be adjusted relative to the serrated wheel 16. Attached to the block 21 by means of bolts 25 and 26, is a pair of wires 24 bent to conform with the periphery of the serrated wheels 16 and against which the spears of the broom corn travel when being conveyed from the feeding table to the mechanism of the endless conveyer. Proper mechanism is provided for transmitting power to the serrated wheels 16 to cause them to rotate to convey the spears of broom corn from the feeding table to the endless conveyer.

Suitably attached to the mounting frame by means of bearings (not shown), is a shaft 31 provided with means for moving the upper conveyer belt 14 of the conveyer mechanism. Mounted directly below shaft 31 is a second shaft 32 which transmits power to rotate the lower belt 15 of the conveyer mechanism. A pulley 33 is attached to the lower shaft 32, and a belt 34 connects this pulley to the small pulley 12 mounted on the main driving shaft 9. Suitably fastened to the shaft 32 is a gear wheel 36 which meshes with a gear wheel 35 mounted on shaft 31 so as to transmit power to shaft 31 so that when shaft 32 is rotated through the medium of the pulleys 33 and 12, the shaft 31 will also be rotated.

Extending the length of the mounting frame and supported by a cross beam is a U-shaped channel iron 37. The lower chain 38 of the conveyer mechanism which carries the lower belt 15 rides in this channel and passes over a gear wheel 40 attached to the shaft 32, and over a gear wheel 41 mounted on a shaft supported by the feeding table.

It will be noted from inspection that the lower conveyer belt 15 is slightly longer than the conveyer chain 38, and passes over an idler 44 attached to one of the upright posts of the mounting frame by means of a bracket 101. The upper conveyer chain 45 passes over a gear wheel 46 attached to the shaft 31, and over a gear wheel 47 carried by an adjustable arm 48. The upper conveyer belt 14 is also slightly greater in length than the upper conveyer chain 45, and passes over an idler 50. The idler 50 comprises a pair of arms 68 (only one of which is shown) which holds a roller 69 and is pivoted at point 70 to an upper cross beam of the mounting frame. Tension means in the form of a coiled spring 71 is provided for maintaining the tension on the upper conveyer belt.

Suspended from the upper cross beam 102 of the mounting frame is a floating cross beam 51. The cross beam may be raised and lowered by means of adjusting screws 52 and 53 mounted immediately below the cross beam 51 in a channel iron 54, which is similar to channel iron 37 but which is divided into three sections. Securely attached to each section of the channel iron 54 is a pair of pins, such as pin 55, which extends upward into the floating cross beam 51. Encircling the pins 55 are coiled springs 56 which yieldingly hold the upper conveyer belt 14 in engagement with the lower conveyer belt 15. To increase or decrease the pressure of the upper conveyer belt upon the lower conveyer belt, it is only necessary to raise or lower the floating cross beam 51 by means of adjusting screws 52 and 53. Adjusting hangers 103 and 104 which hold the floating beam 51 are U-shaped, and extend over the cross beam 102 of the frame. These hangers are connected to the floating beam 51 by means of screws, such as 93. The screws 52 and 53 are provided with threads that engage tapped threads in the U-shaped hangers and are for raising and lowering the floating beam 51, as hereinbefore mentioned.

The upper conveyer chain and the lower conveyer chain are both constructed in such a manner that a U-shaped orifice 58 extends the length of the channels, as most clearly shown in Fig. 3. Riveted to the lower conveyer belt 15 is a leather strap 59 of a height to permit the central portion of the lower conveyer belt to be pressed downward until it is below the level of the side portions of the belt which rests upon the outer arms 60 of the chain. Riveted to the upper conveyer belt by means of rivets 61 is a leather strap 62 which is of a greater thickness than the strap 59 and operates to press the central portion of the upper conveyer belt 14 downward into engagement with the dished-out portion of the lower conveyer belt 15, as shown clearly in Fig. 3. These belts are arranged in this manner so as to securely hold the individual straws of the spears of broom corn as they are moved along by the upper and lower conveyer belts and are being operated upon by the rotary knife, the cleaning drum and the separating drum, as will be hereinafter more fully explained.

It will also be noted that the links of the chain are so arranged that each member 60 of the lower chain comes between two adjacent members 60 of the upper chain. This is most clearly shown in Fig. 4 of the drawings. By having the arms 60 of the upper chain staggered in relation to the arms 60 of the lower chain, the outer edges of the belts are alternately raised and depressed in wave form to prevent the broom corn from twisting sidewise when being conveyed by the conveyer mechanism and operated upon by the operating devices. The links $60^1$ of the chain, which are provided with outwardly extending arms 60, are connected together by channel shaped links $60^2$. Rivets $60^3$ are provided to connect the links $60^1$ of the chain with the links $60^2$. At the end of the conveyer mechanism is a pair of guide springs 75 (only one of which is shown) which is secured to the mounting frame and directs the passage of the broom corn as it is conveyed out from between the upper and lower conveyer belts onto a catch-pan.

Suitably mounted at the front end of the large mounting frame adjacent the small mounting frame, is a shaft 77 suitably journaled in bearings which are supported by hangers 79¹ (only one of which is shown). Attached to one end of this shaft is a rotatable cutting knife 80, and mounted on the shaft 77 between its bearings is a pulley 81. A belt 82 is provided which passes over the said pulley 81 and the pulley 13 mounted on the main driving shaft 9. This belt transmits power to the shaft 77 and causes the rotation of the rotary knife 80 to cut the spears of broom corn at their knuckles, as will be hereinafter more fully explained.

Mounted at right angles to the main shaft 9 and suitably supported in bearings are two rotatable sub-shafts 83, only one of which is clearly shown in Fig. 1, the other being mounted directly behind the said first shaft and on the opposite side of the conveyer mechanism. Attached to each of the sub-shafts 83 is a drum 85 which is provided with a plurality of spears 86 for threshing out the seed of the broom corn as it is moved along by the conveyer mechanism and for breaking up or separating the straws of the spears of broom corn after it is cut at its knuckles. Attached to each of the shafts 83 is a small pulley, such as pulley 87. A belt 88 is also provided for each of the shafts 83 for rotating the same.

Having described in detail the parts that go to make up my device, I will now explain its functions and use.

Assuming that the power device has been connected, the main shaft 9 and the different pulleys and gear wheels will be set in motion, as hereinbefore described. The operator places spears of broom corn on to the serrated wheels 16 under the guide wires 24, and the said serrated wheels 16 rotating transmit the spears of broom corn from the point where they are placed upon the serrated wheels around to the conveyer mechanism where they are inserted between the upper and lower belts of said endless conveyer mechanism. The conveyer mechanism now carries the spears of broom corn into engagement with the rotating knife 80 which operates to cut off superfluous parts of the spear at the knuckle of the spear, cutting each spear at its proper point. The spears of the broom corn are then carried into engagement with the rotating drums 85. The one rotating drum operates to thresh out the seed of the broom corn, while the other rotating drum operates to split up or separate the individual straws of the spear so that no two straws will remain connected together. After these operations are completed, the spear is transmitted from between the conveyer belts into the catch pan (not shown), being guided into this pan by the guide wires 75.

From the construction of the conveyer mechanism, it will be apparent that the broom straw is held very securely between the conveyer belts due to the central portion of the upper belt fitting down into the dished-out portion of the lower belt, and also due to the links 60 of the lower chain fitting between the links 60 of the upper chain. It will also be seen from the foregoing that the tension upon the upper belt may be readily, quickly and suitably adjusted by means of the adjusting screws 52 and 53.

From the foregoing description, it is believed that the general actuation and construction of the conveyer mechanism of my device will be readily understood without going into further minute details of the construction and operation of my device.

In illustrating my invention, I have shown the preferred form but it is to be understood that many changes and modifications thereof may readily suggest themselves to one skilled in the art, and I, therefore, do not desire to be limited to the exact structure as shown and described but aim to cover all such changes and modifications which come within the spirit and scope of the appended claims.

What I claim as new, and desire to secure by United States Letters Patent is:

1. A device of the character described including a pair of flat endless belts normally in engagement with each other throughout a portion of their lengths, and a pair of chains adjacent said belts for moving the same, means for said chains for causing the central portion of one of said belts to force the central portion of the other of said belts below the plane of its sides throughout the length of engagement of said belts, and means for supporting said belts and chains in position.

2. A device of the character described for conveying spears of broom corn, including a pair of endless belts, a pair of chains supporting said belts and for moving the same, downwardly extending members for one of said chains, upwardly extending members for the other of said chains adapted to mesh with the downwardly extended portions of said first chain, thereby producing a wave effect of said belts throughout their length of engagement, and means for maintaining said belts in contact with each other throughout their length of engagement.

3. A device of the character described, including a pair of endless belts normally in engagement with each other throughout a portion of their lengths, a pair of chains adjacent to said belts for moving the same, a protruding member for one of said chains adapted to depress the central portion of one of said belts below the plane of its sides throughout the length of engagement of said belts, means for supporting said belts and chains in position, and spring tension means for holding said belts in engagement.

4. A device of the character described, including a pair of endless belts, a pair of chains adjacent said belts for moving the same, a central raised portion for one of said chains to cause the central portion of one of said belts to force the central portion of the other of said belts below the plane of its sides throughout the length of engagement of said belts, means for supporting said chains and belts in position, and spring means for regulating the tension of said belts.

5. A device of the character described, including a frame, a channel iron extending lengthwise of said frame, a plurality of channel irons supported immediately above said first channel iron, an endless chain adapted to travel in said first channel iron, a second endless chain adapted to travel in said other channel irons, a pair of endless belts normally in engagement with each other throughout the length of said channel irons and adapted to be moved by said chains, a central projecting portion for one of said chains adapted to depress the central portions of said endless belts throughout their engagement so that the central portions of the belts are depressed below the plane of the sides of the belts, and spring means normally acting on said plurality of channel irons, thereby regulating the tension between said belts.

6. A device of the character described, including a frame, a channel iron extending lengthwise of said frame, a plurality of channel irons supported immediately above said first channel iron, an endless chain adapted to travel in said first channel iron, a second chain adapted to travel in said other channel irons, a pair of flat endless belts normally in engagement with each other throughout the length of said first channel iron and adapted to be moved by said chains, a central projecting portion for one of said chains adapted to depress the central portions of said flat endless belts throughout their engagement so that the central portions of the belts are depressed below the plane of the sides of the belts, spring means normally acting on said plurality of channel irons, thereby regulating the tension between said belts, and means for adjusting the tension of said spring means.

7. A device of the character described, including a pair of endless belts, a pair of chains supporting said belts and for moving the same, alternately raised and receding members for said chains for alternately raising and depressing the said belts throughout their length of engagement, means for mounting said chains and belts in position, and spring means for regulating the tension between said belts.

8. A device of the character described, including a pair of flat endless belts normally engaged with each other throughout a portion of their lengths, a pair of chains adjacent said belts for moving the same, alternately raised and receding members for said chains for alternately raising and lowering said belts throughout their length of engagement, thereby producing a wave effect of said belts, means for supporting said chains and belts in position, and spring means for regulating the tension between said belts.

9. A device of the character described, including a framework, a channel iron extending lengthwise of said frame, a plurality of channel irons extending lengthwise of said frame and mounted immediately above said first channel iron, a pair of endless chains adapted to travel in said channel irons, a pair of endless belts normally in engagement with each other throughout a portion of their length and adapted to be moved by said chains, upwardly and downwardly extending members for said chains for producing a wave effect to said belts throughout their length of engagement, and spring means acting on said plurality of channel irons for regulating the tension between said belts.

10. A device of the character described, including a framework, a channel iron extending lengthwise of said frame, other channel irons extending lengthwise of said frame and mounted immediately above said first channel iron, a pair of endless chains adapted to travel in said channel irons, a pair of endless belts normally in engagement with each other throughout a portion of their length and adapted to be moved by said chains, upwardly and downwardly extending members for said chains for giving a wave effect to said belts throughout their length of engagement, a central raised member for one of said chains for forcing the central portions of said belts below the plane of the sides of said belts, and spring means acting upon said other channel irons to regulate the tension between said belts.

11. A device of the character described, including a pair of endless belts normally in engagement with each other throughout a portion of their lengths, a pair of endless chains adjacent said belts for moving the same, members for said chains for producing a wave effect to said belts throughout their length of engagement, other members for said chains for permitting the central portion of said belts to be depressed throughout their length of engagement below the plane of the sides of said belts, and means for mounting said chains and belts in position.

12. A device of the character described, including a pair of endless belts, a pair of chains supporting said belts and for moving the same, alternately raised and receding members for said chains for alternately raising and depressing the said belts throughout their length of engagement, means for mounting said chains and belts in position, spring means for regulating the tension between said belts, and spring means for regulating the tension of each of said belts.

Signed by me at Chicago, in the county of Cook and State of Illinois, this 17th day of October, 1917.

GEORGE E. RUDOLPH.